May 27, 1969

D. P. SHELDON 3,447,072

COLD CATHODE PENNING TYPE GAUGE FOR MONITORING VACUUM
LEVEL IN A SPUTTERING PROCESS

Filed Dec. 22, 1966

United States Patent Office 3,447,072
Patented May 27, 1969

3,447,072
COLD CATHODE PENNING TYPE GAUGE FOR MONITORING VACUUM LEVEL IN A SPUTTERING PROCESS
Deane P. Sheldon, Franklin, Mass., assignor to National Research Corporation, Newton Highlands, Mass., a corporation of Massachusetts
Filed Dec. 22, 1966, Ser. No. 604,053
Int. Cl. G01n 27/62
U.S. Cl. 324—33         1 Claim

ABSTRACT OF THE DISCLOSURE

A Penning type ionization gauge is operated with an alternating current potential source to produce a characteristic wide scale over the pressure range $10^{-4}$ to $10^{-2}$ torr. A transformer with an adjustable load resistance in the primary circuit and a calibration resistor in the secondary circuit provides a built-in calibration function for the gauge to allow for regional variations in line voltage without the expense of a line voltage regulator.

---

The present invention relates to cold cathode vacuum gauges of the Penning type and a form of such gauge particularly suitable for monitoring vacuum level in a sputtering process.

An object of the invention is to provide a vacuum gauge having a wide band response as a function of pressure over the range $10^{-4}$ to $10^{-2}$ torr.

Other objects, features, and advantages of the invention will in part be obvious and will in part appear hereinafter.

General description

The object is met by a Penning type ionization gauge operated on alternating current. The gauge is operated by a circuit including a transformer with a secondary winding having first and second terminals. The first terminal is connected to a gauge electrode and the second terminal is connected to a meter movement via a rectifier bridge. Calibration sensing and adjusting means are included in the circuit.

For a specific description of a preferred embodiment of the invention reference should be had to the following drawings wherein.

Figure 1:
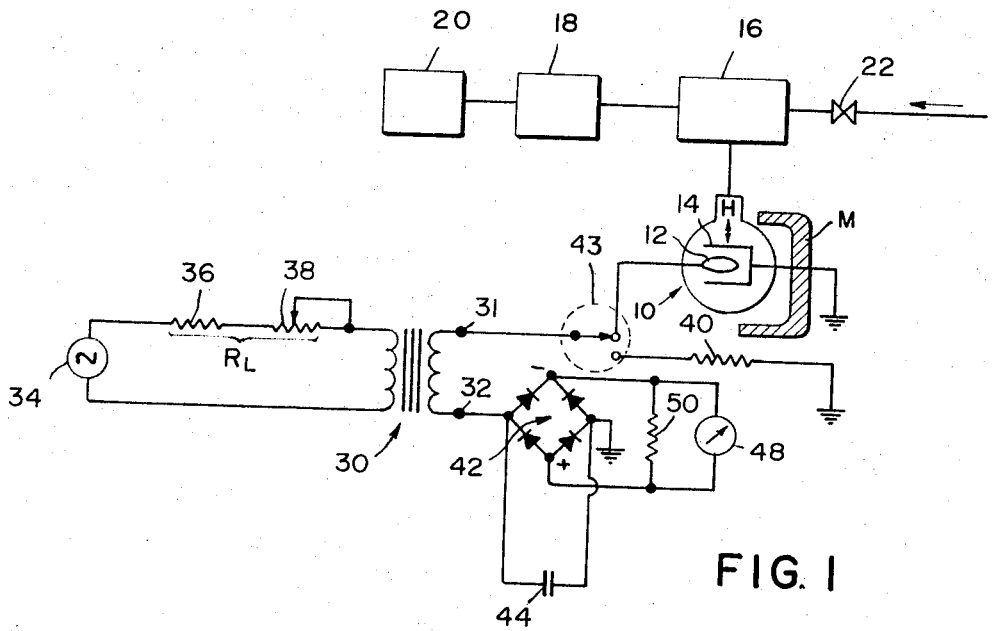
FIG. 1 is a circuit diagram of the preferred embodiment.

Referring now to FIG. 1 there is shown a vacuum gauge 10 of the type described in U.S. Patent 2,197,079 to Penning and comprising electrodes 12 and 14 with a magnet M producing a magnetic field H. The usual mode of operating such gauges is with the central ring electrode 12 as anode and twin plate electrode 14 as cathode. The gauge is connected to a sputtering unit 16 of the type shown, for instance, in U.S. Patent 3,021,271 to Wehner. The sputtering unit is evacuated to a pressure of less than $10^{-3}$ torr via pumps 18, 20 and backfilled to about $10^{-3}$ torr via a vent valve 22. It is important to have a good pressure measurement for control of the evacuation, backfilling and sputtering process. But prior art gauges are either marginal in performance in this pressure range or too expensive. As an example of marginal performance of the prior art gauges, the conventional D.C. operated Penning gauge has about 5% of its output scale covering the critical range from $1 \times 10^{-3}$ torr to $1 \times 10^{-2}$ torr. The present gauge has about 30% of its scale covering the same pressure range.

A step-up voltage transformer is shown at 30 with output terminals 31 and 32. The transformer is selected to provide 2000 volts with 20 milliampere short circuit current. The primary winding circuit of the transformer comprises a house power alternating current source 34, and a load resistance $R_1$ comprising a 1K fixed resistor 36 and a zero to 4K variable resistor 38. The secondary winding circuit of the transformer comprises a 330K calibration signal resistor 40 and a switching means 43 (which may be a switch or a plug connected to 31 and jacks connected to 12 and 40). The secondary winding circuit also comprises, connected to terminal 32, a diode bridge rectifier circuit 42 with four 50 volts peak-inverse voltage diodes, the bridge having a plus terminal, a minus terminal and two mid terminals. A .01 microfarad radio frequency filtering capacitor 44 is connected across the mid terminals of the bridge. One of the mid terminals is connected to terminal 32 of the transformer. The other mid terminal is connected to ground. A single range 1.0 milliamp-full-scale meter 48 is connected across the plus and minus terminals of the bridge. A 10K protective resistor 50 is placed in parallel with the meter.

Figure 2:
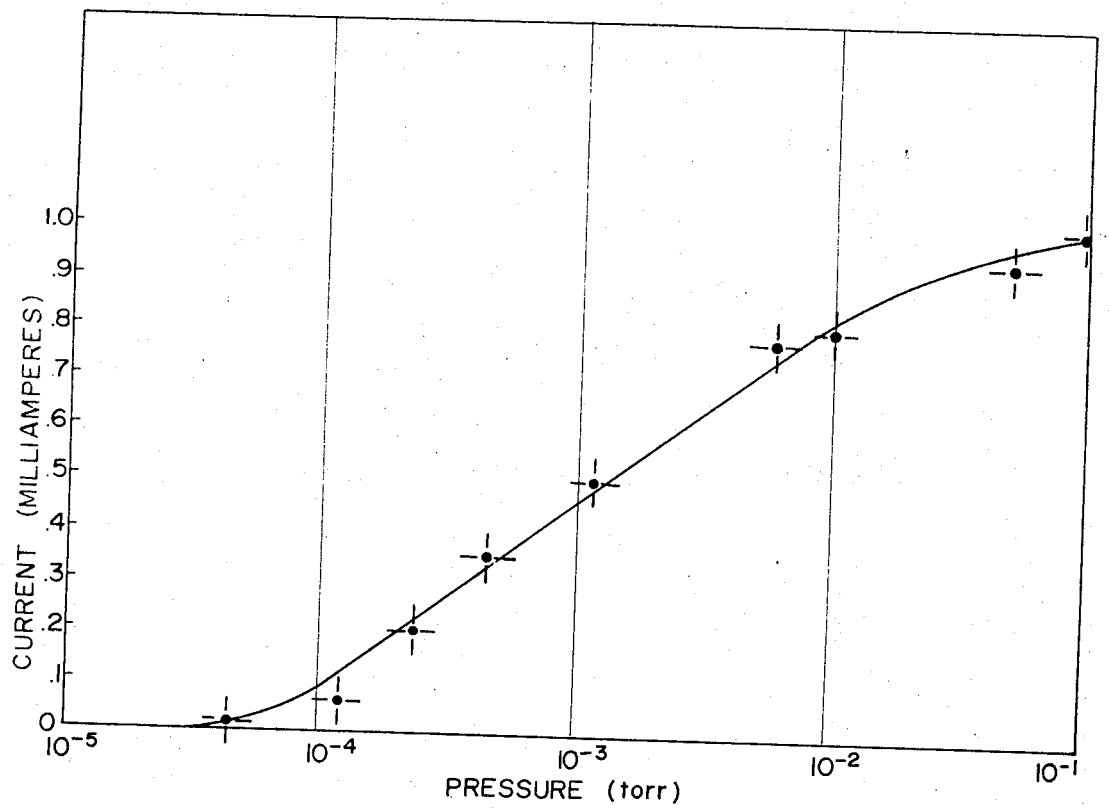
FIG. 2 is a semi-logarithmic calibration curve for the gauge showing its unique pressure reading characteristic.

A performance curve for the FIG. 1 circuit is shown in FIG. 2. Pressure is plotted logarithmically on the $x$-axis and current readings at meter 48 are plotted linearly on the $y$-axis. The curve shows an unusual response characteristic ideally suited to sputtering units and other vacuum coaters and mass spectrometer leak detector instruments. This good performance can be correlated to the unique circuit wherein the meter is floated with respect to ground via an arm of the rectifier bridge on both positive and negative half cycles of firing of gauge 10. The gauge is operated in true alternating current fashion without rectification at the gauge. This is accomplished consistent with economy because only a single high voltage feedthrough has to be built into the gauge (for electrode 12).

Line voltage power supply varies by as much as plus or minus 5% in various parts of the United States. Therefore, before putting the gauge into use the operator throws switch 43 to connect the terminal 31 to ground via resistor 40, which is sized to provide a signal at meter 48 of full scale corresponding to the high pressure end of the pressure measuring range ($10^{-1}$ torr). If the gauge does not read 1.0 milliampere, the operator adjusts resistor 38 to reset the meter to 1.0.

What is claimed is:
1. A vacuum gauge comprising
 (a) a gauge tube with first and second electrodes and a magnet arranged in Penning type construction, with the first electrode arranged for connection to a high voltage source and the second electrode connected to ground;
 (b) a step-up voltage transformer with primary winding circuit comprising the following (c) and a secondary winding circuit comprising the following elements (d)–(g);
 (c) adjustable resistance means in said primary winding circuit for adjusting the gauge calibration;
 (d) a calibration resistance corresponding to highest pressure signal of the gauge for providing a calibration signal and having a connection to ground;
 (e) a rectifier bridge circuit with plus, minus, and two mid terminals with a radio frequency filtering capacitor connected across said mid-terminals to filter radio frequency noise;
 (f) the secondary winding circuit of the transformer having first and second terminals, the first terminal being selectively connected to the said first electrode of the gauge and calibration resistance via switching means and the second terminal of the secondary winding being connected to one of said mid terminals of the rectifier bridge with the other of said mid terminals being connected to ground;

(g) a meter movement connected across the said plus and minus terminals of the rectifier bridge;

whereby the meter responds to plus and minus half cycle operation of the gauge to provide a pressure reading scale spread widest over the range $10^{-4}$ torr to $10^{-2}$ torr with correction for line voltage variation.

References Cited

UNITED STATES PATENTS 2,643,342   6/1953   Simpson _____ 250—41.9

JAMES W. LAWRENCE, *Primary Examiner.*

R. F. HOSSFELD, *Assistant Examiner.*

U.S. Cl. X.R.

313—7